United States Patent Office 2,782,195
Patented Feb. 19, 1957

2,782,195

MANUFACTURE OF DIHYDROPYRIDAZINES

Jean Druey, Riehen, and Kurt Eichenberger, Basel, Switzerland, assignors to Ciba Pharmaceutical Products, Inc., Summit, N. J.

No Drawing. Application August 31, 1954,
Serial No. 453,423

Claims priority, application Switzerland
September 8, 1953

10 Claims. (Cl. 260—250)

The present invention relates to 1-R-3-OR₁-6-oxo-1,6-dihydropyridazines, in which R represents an aliphatic radical or an aromatic radical containing at most two carbocyclic nuclei, and R₁ represents a lower alkyl radical, and which contain a halogen atom in at least one of the positions 4 and 5.

The aromatic radical may contain substituents such as free or substituted hydroxyl or amino groups or halogen atoms. Examples of an aliphatic radical are especially a lower alkyl radical such as methyl or ethyl, or a lower hydroxyalkyl radical, such as the β-hydroxyethyl radical. An example of an aromatic radical is more especially a phenyl radical. Examples of halogen atoms are preferably chlorine or bromine.

The invention principally concerns the manufacture of 1-R-3-OR₁-6-oxo-1,6-dihydro-pyridazines which are substituted in one of the positions 4 and 5 by a halogen atom and carry in the other of said positions a member of the group consisting of hydrogen and halogen. Such compounds are more especially 1-methyl-3-methoxy-4,5-dichloro-6-oxo-1,6-dihydropyridazine, 1-methyl-3-methoxy-4,5-dibromo-6-oxo-1,6-dihydro-pyridazine, and 1-phenyl-3-methoxy-4-chloro-6-oxo-1,6-dihydro-pyridazine.

The new compounds possess valuable properties. Thus, the compounds of this kind having an aromatic radical in 1-position have an anticonvulsive effect and are useful as anticonvulsive agents, whilst those having an aliphatic radical in 1-position have an antiparasitic effect, more especially an amoebacidal effect, for example against Entamoeba histolytica, and can be employed as amoebacides. The latter group of compounds also exhibits a hypotensive effect. The new compounds are also valuable intermediates for the preparation of medicaments. Thus, the pyridazines having an aromatic radical in 1-position may be converted into the corresponding amino compounds which have an analgesic effect by reaction with ammonia or with primary or secondary amines having a low aliphatic radical. Thus 1-phenyl-3-methoxy-5-chloro-6-oxo-1,6-dihydro-pyridazine can be reacted with dimethylamine in alcoholic solution to give 1-phenyl-3-methoxy-5-dimethylamino-6-oxo-1,6-dihydropyridazine, which can be used as an analgesic.

In general the aforesaid 6-oxo-1,6-dihydropyridazines can be prepared by reacting a 3-hydroxy-6-oxo-1,6-dihydro-pyridazine which is unsubstituted in 1-position or substituted by R as defined above with a reactive ester of a lower alkanol, especially an ester of a strong inorganic or organic acid, particularly sulfuric acid. In the latter case if only the 3-hydroxy group is to be alkylated, the reaction is preferably carried out in the presence of a solvent, such as an alcohol or an ether, and in the presence of an alkaline condensing agent. If the alkyl group is also to be introduced in the 1-position the alkylation is preferably effected by treating the pyridazine compound with an excess of the lower alkyl sulfuric acid ester, e. g., dimethyl sulfate.

The new compounds can be used as medicaments for example in the form of pharmaceutical preparations containing in admixture a pharmaceutical organic or inorganic carrier material suitable for enteral or parenteral application. For the preparation of the carrier material those substances come into consideration which do not react with the new compounds, such as for example, water, gelatine, lactose, starches, magnesium stearate, talc, vegetable oils, benzyl alcohols, gums, polyalkylene glycols, petroleum jelly, cholesterol or other known carriers for medicaments. The pharmaceutical preparations can be for example in the form of tablets, dragees or in liquid form as solutions, suspension or emulsions. If desired, they may be sterilized and/or contain auxiliaries, such as a preservative, stabilizing, wetting or emulsifying agent, salts for the adjustment of osmotic pressure or buffers. They may also contain other therapeutically valuable substances. The preparations are made according to the usual methods.

The following examples illustrate the invention, the parts being by weight unless otherwise stated, and the relationship of parts by weight to parts by volume being the same as that of the gram to the cubic centimeter:

Example 1

1.15 parts of sodium are dissolved in 120 parts by volume of methanol. To the solution are added 11.1 parts of 1-phenyl-3-hydroxy-4-chloro-6-oxo-1,6-dihydropyridazine and 5.3 parts by volume of diemthyl sulfate. The reaction solution is boiled under reflux for one hour. After cooling the mixture, it is evaporated to dryness in vacuo, the residue is taken up in ether, and the ethereal solution is washed with a 1 N-solution of caustic soda, dried and evaporated. The residue is recrystallized from isopropyl ether. There are obtained 4.2 parts of 1-phenyl - 3 - methoxy - 4 - chloro - 6 - oxo - 1,6 - dihydropyridazine of the formula

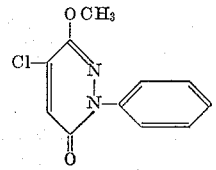

melting at 115–116° C.

The 1 - phenyl - 3 - hydroxy - 4 - chloro - 6 - oxo - 1,6-dihydropyridazine used as starting material is prepared as follows: To a solution of 256 parts by weight of phenylhydrazine in 700 parts by volume of glacial acetic acid, 313 parts by weight of chloro-maleic anhydride, dissolved in 700 parts by volume of glacial acetic acid, are added and the mixture is boiled under reflux for three hours. After cooling, the 1-phenyl-3-hydroxy-4-chloro-6-oxo-1,6-dihydropyridazine, which has crystallized out, is filtered with suction and washed with glacial acetic acid and then with water. After recrystallization from glacial acetic acid it melts at 255–256° C.

The glacial acetic acid mother liquor is evaporated in vacuo, the residue is dissolved in chloroform and the chloroform solution extracted with a 2-N solution of caustic soda. The caustic soda extract is filtered with animal charcoal, rendered acid to Congo with hydrochloric acid and the yellowish precipitate is filtered with suction. By fractional recrystallization from ethyl acetate there is obtained, in addition to a small quantity of the above described 4-chloro derivative, the 1-phenyl-3-hydroxy-5-chloro-6-oxo-1,6-dihydropyridazine in needles melting at 198–199.5° C.

Example 2

11.1 parts of 1-phenyl-3-hydroxy-5-chloro-6-oxo-1,6-dihydropyridazine are stirred in 100 parts by volume of methanol with 5.3 parts by volume of dimethyl sulfate at 40° C. and a solution of 1.15 parts of sodium in 50 parts by volume of methanol is added dropwise. After the addition is complete, the whole is boiled for 1 hour under reflux. After distilling off the methanol in vacuo, the residue is taken up in methylene chloride, and the solution filtered and washed twice with 2-N solution of soda to remove any unreacted starting material. After distilling off the methylene chloride, the residue is dissolved in hot isopropyl ether and the solution filtered hot with charcoal. The whole is allowed to cool, the precipitated portions are filtered off, and the filtrate is concentrated to a third of its volume. On scratching the side of the vessel 1-phenyl-3-methoxy-5-chloro-6-oxo-1,6-dihydropyridazine of the formula

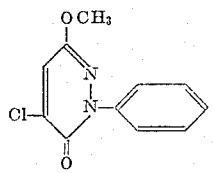

crystallizes. After recrystallization from isopropyl ether the colorless prisms melt at 83–84° C.

The 1-phenyl-3-hydroxy-5-chloro-6-oxo-1,6-dihydropyridazine used as starting material is prepared according to the method described in Example 1.

*Example 3*

22.7 parts of α-chloro-N,N'-maleyl-hydrazine and 45.4 parts by volume of dimethyl sulfate are heated for 8 hours at 145–150° C. After cooling, the whole is mixed with 68 parts by volume of water and heated for 30 minutes at 60–80° C. The aqueous solution is filtered, mixed with 45.4 parts of potassium carbonate, and extracted with chloroform. The chloroform solution is dried and evaporated. The residue is extracted at the boil with ether for 15 minutes, insoluble matter is filtered off, and the filtrate is evaporated. The residue is taken up in petroleum ether, the insoluble matter is filtered off, and the petroleum ether solution is evaporated until crystallization takes place. In this manner there is obtained 1-methyl-3-methoxy-4-chloro-6-oxo-1,6-dihydropyridazine of the formula

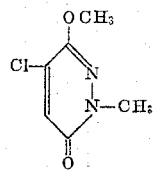

melting at 85–87° C.

The α-chloro-N,N'-maleyl-hydrazine is prepared as follows: 133 parts of hydrazine sulfate are suspended in 500 parts by volume of hot water and 133 parts of monochloromaleic anhydride are added. The mixture is boiled under reflux for 3 hours. After cooling, the precipitated product is filtered off with suction, washed well with water and dried at 100° C. The α-chloro-N,N'-maleyl-hydrazine melts at 252–253° C. with decomposition.

*Example 4*

30 parts of α,α'-dibromo-N,N'-maleyl-hydrazine are heated with 120 parts by volume of dimethyl sulfate for 8 hours at 145–150° C., and worked up in a manner analogous to that described in Example 3. The chloroform residue is extracted with ether at the boil, and the ethereal solution is evaporated until crystallization commences. There is obtained 1-methyl-3-methoxy-4,5-dibromo-6-oxo-1,6-dihydropyridazine of the formula

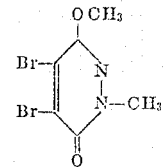

melting at 131–132° C.

The α,α'-dibromo-N,N'-maleyl-hydrazine is obtained by boiling 27.4 parts of dibromo-maleic acid and 14 parts of hydrazine sulfate in 150 parts by volume of water for 3 hours. The product does not possess any distinct melting point, but decomposes above 200° C. while becoming black in color.

*Example 5*

40 parts of α,α'-dichloro-maleyl-hydrazine are dissolved in 160 parts of hot dimethyl sulfate and then heated for 5 hours at 150° C. The reaction product is worked up in a manner analogous to that described in Example 3. The chloroform residue is extracted with ether at the boil, the ethereal solution is concentrated by evaporation and petroleum ether is added, whereupon 1-methyl-3-methoxy - 4,5 - dichloro - 6 - oxo - 1,6-dihydropyridazine of the formula

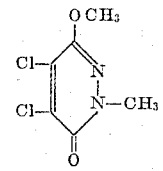

crystallizes out. It melts at 127–130° C.

The α,α'-dichloro-maleyl-hydrazine is obtained by boiling 167 parts of dichloro-maleic acid anhydride and 130 parts of hydrazine sulfate in 1500 parts by volume of water for 5 hours. The product melts at 290–292° C. with decomposition.

*Example 6*

6.11 parts by weight of 1-(β-hydroxyethyl)-3-hydroxy-4,5-dichloro-6-oxo-1,6-dihydropyridazine are dissolved in 27.2 parts by volume of dioxane and 27.2 parts by volume of 1 N-NaOH at 40° C.; 3.1 parts by volume of dimethyl-sulfate are added dropwise while stirring and stirring is continued for 30 minutes at 40–50° C. The solution is evaporated under reduced pressure at 40–50° C. and the crystalline residue is mixed with saturated sodium carbonate solution and extracted with chloroform. The chloroform solution is washed with water, dried and evaporated. There is thus obtained the 1-(β-hydroxyethyl) - 3-methoxy-4,5-dichloro-6-oxo-1,6-dihydropyridazine of the formula

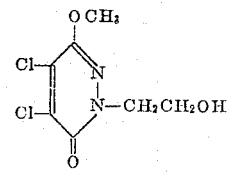

melting at 102–105° C.

The 1-(β-hydroxyethyl)-3-hydroxy-4,5-dichloro-6-oxo-1,6-dihydropyridazine can be obtained as follows: 10.85 parts by weight of 70% β-hydroxyethyl-hydrazine are converted into the sulfate by treatment with 150 parts by volume of dilute aqueous sulfuric acid (containing 9.8 parts by weight of 100% sulfuric acid). Into this aqueous solution, 16.7 parts by weight of finely powdered dichloro-maleic acid anhydride are added while stirring. The reaction mixture is then boiled under reflux while stirring for 5 hours. After cooling, the crystalline reaction product is filtered with suction, washed with water, and recrystallized from methanol. There are obtained 16 parts by weight of 1-(β-hydroxyethyl)-3-hydroxy-4,5-dichloro - 6 - oxo - 1,6 - dihydropyridazine melting at 208–210° C.

What is claimed is:

1. 1-R-3-lower alkoxy-6-oxo-1,6-dihydropyridazines in which R represents a member of the group consisting of phenyl, lower alkyl and lower hydroxy alkyl radicals, and which contain a member of the group of chlorine and bromine in at least one of the positions 4 and 5 of the pyridazine ring.

2. 1-lower alkyl-3-lower alkoxy-6-oxo - 1,6 - dihydropyridazines which contain a chlorine atom in at least one of the positions 4 and 5.

3. 1-lower alkyl-3-lower alkoxy-6-oxo - 1,6 - dihydropyridazines which contain a chlorine atom in each of the positions 4 and 5.

4. 1-lower hydroxyalkyl-3-lower alkoxy-6-oxo-1,6-dihydro-pyridazines which contain a chlorine atom in each of the positions 4 and 5.

5. 1-phenyl-3-lower alkoxy-6-oxo-1,6-dihydro - pyridazines which contain a chlorine atom in at least one of the positions 4 and 5 of the pyridazine ring.

6. 1 - phenyl - 3 - methoxy - 4 - chloro - 6 - oxo - 1,6- dihydropyridazine.

7. 1 - phenyl - 3 - methoxy - 5 - chloro - 6 - oxo - 1,6- dihydropyridazine.

8. 1 - methyl - 3 - methoxy - 4 - chloro - 6 - oxo - 1,6- dihydropyridazine.

9. 1 - methyl - 3 - methoxy - 4,5 - dichloro - 6 - oxo-1,6-dihydropyridazine.

10. 1 - (β - hydroxyethyl) - 3 - methoxy - 4,5 - dichloro-6-oxo-1,6-dihydropyridazine.

References Cited in the file of this patent

Chemical Abstracts, 43:579$^h$ (1949), citing Arndt et al., Rev. faculte, Sci. Univ., Istanbul, 13A:103–126 (1948).